United States Patent [19]

Foster et al.

[11] Patent Number: 5,042,531
[45] Date of Patent: Aug. 27, 1991

[54] ENERGIZED SEAL FOR ORIFICE PLATE

[76] Inventors: James H. Foster, 5050 Ambassador Way, No. 301, Houston, Tex. 77056; John Beson, 10938 Leaning Ash, Houston, Tex. 77079

[21] Appl. No.: 537,042

[22] Filed: Jun. 11, 1990

[51] Int. Cl.⁵ .............................................. F15D 1/02
[52] U.S. Cl. ..................................... 138/44; 138/40; 251/175; 251/193; 277/3; 277/27; 277/73
[58] Field of Search ............... 138/40, 44, 94; 277/27, 277/71, 72, 3, 74, 73, 103; 251/175, 182, 193

[56] References Cited

U.S. PATENT DOCUMENTS

| | | |
|---|---|---|
| 268,679 | 12/1882 | Wendell . |
| 941,536 | 11/1909 | Renaud .................................. 277/73 |
| 1,996,192 | 4/1935 | Daniel .................................... 138/44 |
| 4,256,314 | 3/1981 | Berglund ................................ 277/27 |
| 4,328,949 | 5/1982 | Oddenino ............................. 251/175 |
| 4,343,193 | 8/1982 | Dawson et al. . |
| 4,633,911 | 1/1987 | Lohn . |

FOREIGN PATENT DOCUMENTS 1217999  5/1960  France ................................. 277/74

Primary Examiner—Harvey C. Hornsby
Assistant Examiner—Terrence R. Till
Attorney, Agent, or Firm—James E. Bradley

[57] ABSTRACT

A orifice fitting for measuring gas flow in gas pipelines has an energized seal. The orifice fitting has a plate carrier which moves downward into a seat slot to position an orifice plate in the gas flow. An annular seal mounts to the plate carrier for engaging a downstream side of the seat slot. The seal is energized or pressed outwardly by hydraulic fluid pressure. The plate carrier has a chamber containing hydraulic fluid and a piston. A pin protrudes outward. The orifice fitting slide valve carrier engages and pushes the pin downward as the slide valve carrier moves to the closed position.

16 Claims, 2 Drawing Sheets

ENERGIZED SEAL FOR ORIFICE PLATE

BACKGROUND OF THE INVENTION

1. Field of the Invention

This invention relates in general to orifice plate equipment for measuring gas flow in pipelines, and in particular to a seal for sealing the plate carrier of an orifice plate against the seat in an orifice fitting body.

2. Description of the Prior Art

One method of measuring gas flow in pipelines is by the use of an orifice fitting. The orifice fitting is an assembly that will be mounted for receiving gas flow. It has a body with a passage for the flow of the gas. A gear mechanism will lower an orifice plate down into the gas flow passages. The orifice plate has a hole through it. Gas flow through the hole causes a pressure drop. The difference in pressure upstream and downstream of the plate is used to calculate the gas flow velocity.

A plate carrier carries the orifice plate. The plate carrier has a seal which seals on the downstream side of the orifice plate. The seal seals against an annular seat which surrounds the flow passages. It is important to have good sealing so as to obtain an accurate measurement of the pressure drop.

In the prior art, the seal is an oversized elastomeric ring. It compresses as the plate carrier is forced into a slot between the seats. The slot will have a lesser width than the width of the plate carrier, including the seal.

A disadvantage of this technique is that the seal ring may be easily cut or damaged when forced into the seat slot. Also, variations in face-to-face dimensions between the seats as well as corrosion and erosion of the seat areas often cause leaks past the seal ring. In larger orifice fittings, unsupported segments of the seat area will sometimes expand beyond the yield strength of material during pressure testing. This causes a face-to-face dimension in this portion of the seat slot that is in excess of the allowable limits. This may result in leakage.

Because the leakage around the plate occurs only from an upstream to a downstream side of a plate, and not to the exterior of the fitting, it is difficult to detect. As a result, erroneous readings cause sellers of gas to lose large sums of money.

SUMMARY OF THE INVENTION

In this invention, an energizing means will be mounted in the plate carrier to energize the annular seal. The energizing means will push the seal against the seat once the plate carrier locates in the seat slot.

In the preferred embodiment, the energizing means is actuated by movement of a slide valve carrier. The slide valve carrier is a conventional mechanism that slides a valve transversely to the plate carrier to seal off the slot leading from a lower chamber to an upper chamber. The slide valve carrier also has a cam on its lower side which in the prior art contacts an upper edge of the plate to retain it tightly in position.

In the preferred embodiment, the slide valve carrier cam will engage a pin which protrudes from the upper edge of the plate carrier. The pin engages a piston located inside the plate carrier. The piston will move radially inward within a hydraulic chamber. When moved inward by movement of the pin, the piston increases pressure of hydraulic fluid in the chamber. This increased pressure communicates to the seal to push it tightly against the seat face.

In a second embodiment, hydraulic pressure will be introduced from an external source. The stop screw normally located on the bottom of the seat slot will be replaced by an injection fitting. This injection fitting has an upward protruding mandrel that slides within an injection passage located on the bottom of the plate carrier. Hydraulic fluid from an external source can be introduced through the fitting, through the mandrel and into the hydraulic passage. The injection fitting can be rotated to advance it inward into the body to apply pressure to the seal.

DETAILED DESCRIPTION OF THE INVENTION

Figure 1:
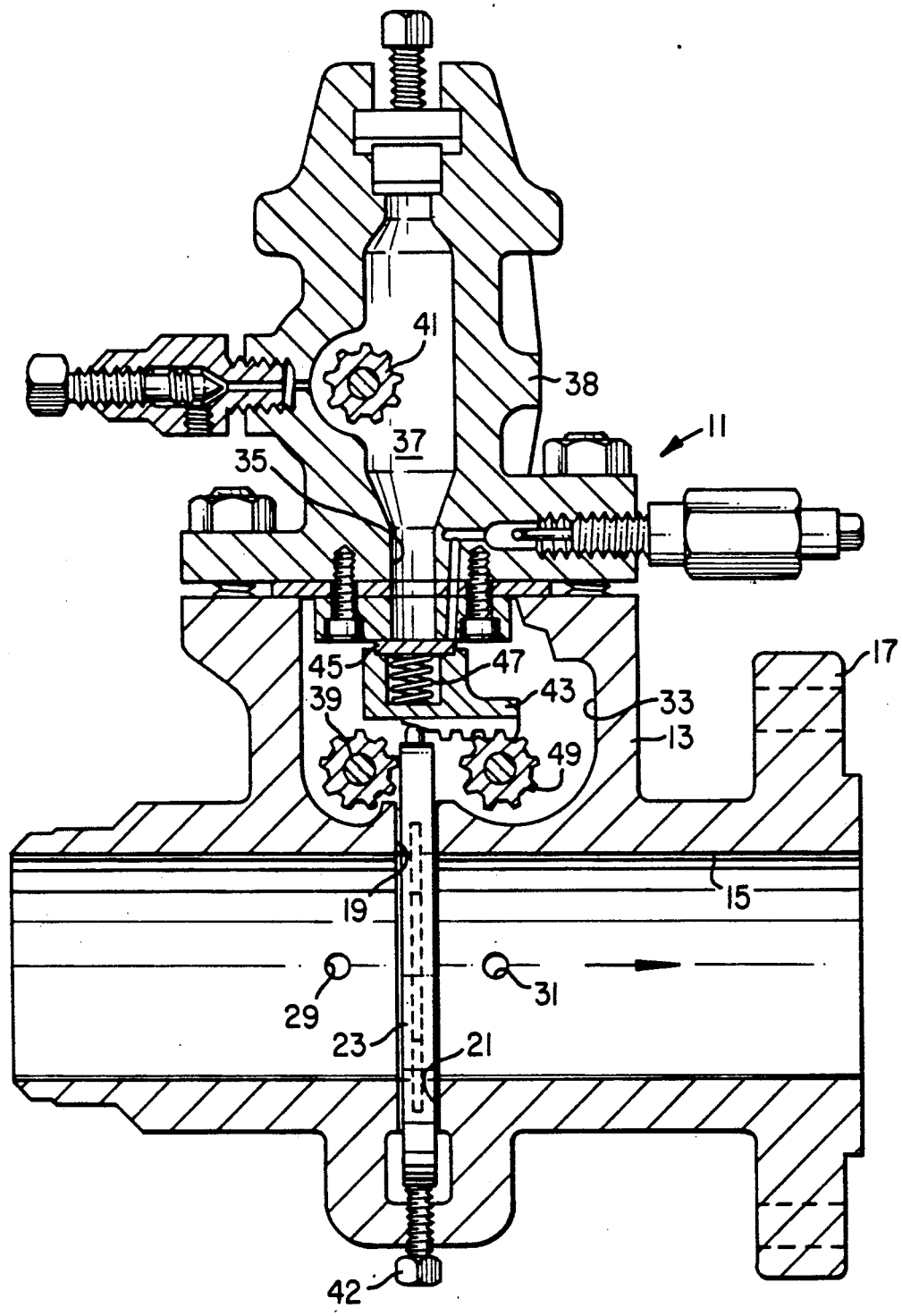
FIG. 1 is a vertical, partially schematic, view of an orifice fitting constructed in accordance with this invention.

Referring to FIG. 1, orifice fitting 11 is an assembly that includes a body 13. Body 13 has a flow passage 15 extending through it. Flange 17 will connect one side of the passage 15 to a pipeline. The other side of the passage 15 will also be connected to a pipeline. Gas will flow through the flow passage 15 as indicated by the arrow.

A seat slot 19 locates in body 13 perpendicular to flow passage 15. The seat slot 19 has opposed annular seats 21. The seats 21 are flat smooth surfaces that are perpendicular to the flow passage 15 and face each other. A plate carrier 23 will locate in the seat slot 19 when in the active position shown in FIG. 1. Plate carrier 23 holds an orifice plate 25, shown in FIG. 2. Orifice plate 25 is a circular flat disk. It has a hole 27 along the central axis of the orifice plate 25.

Figure 2:
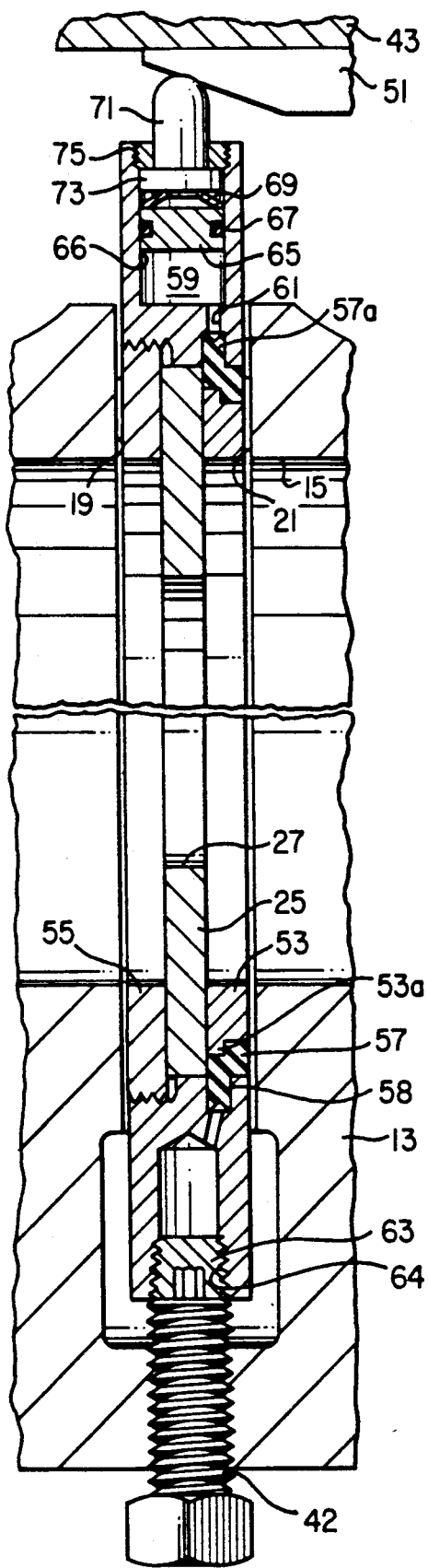
FIG. 2 is a partial enlarged vertical sectional view of the orifice fitting of FIG. 1.

Referring again to FIG. 1, ports 29 and 31 will be located in the flow passage 15 upstream and downstream of the plate 25. Measurement equipment (not shown) measures the pressure observed at the ports 29, 31 in order to determine the flow rate of the gas flowing through the hole 27 in the orifice plate 25 (FIG. 2). This flow rate will be used to calculate the volume of gas flowing through the flow passage 15.

Body 13 has a lower chamber 33 which locates above the flow passage 15. A slot 35 in the upper end of lower chamber 33 leads to an upper chamber 37. The upper chamber 37 is in an upper body section 38, which although a separate member, may be considered part of the body 13 for the purposes herein.

A gear 39 will connect to an external handle (not shown) for moving the plate carrier 23 vertically, perpendicular to the axis of the flow passage 15. Gear 39 engages teeth (not shown) formed on the edge of the plate carrier 23. Gear 41, located in the upper chamber 37 will also engage the plate carrier 23 when it moves upward sufficiently, to move the plate carrier 23 out of the top of the upper chamber 37. While in the upper chamber 37, the plate carrier 23 will be in an inactive position. A stop screw 42 in the bottom of body 13 serves as a stop for downward travel of plate carrier 23.

A slide valve carrier 43 will move a slide valve 45 across the slot 35. Slide valve 45 is urged upward by springs 47 to seal the lower chamber 33 from the upper chamber 37. A gear 49 moves the slide valve carrier 43 in a direction parallel with flow passage 15 and perpendicular to the direction of travel of the plate carrier 23. The slide valve carrier 43 will be in the closed position shown in FIG. 1 when the plate carrier 23 is in its active position shown in FIG. 1. Gear 49 is attached to a shaft which will lead to an external handle (not shown). Gear 49 engages teeth on the slide valve carrier 43 to move it between the closed position shown in FIG. 1 and an open position (not shown) off to one side of the slots 19, 35. Slide valve carrier 43 has a cam plate 51 (FIG. 2) on the bottom which in the prior art would engage an upper edge of the plate carrier 23 to retain it in the lower or active position.

Referring to FIG. 2, orifice plate 25 is sandwiched between two retaining plates 53, 55. Retaining plate 55 secures by threads to the plate carrier 23 to hold the orifice plate 25. Retaining plate 53 has a smaller outer diameter than the aperture in the plate carrier 23 in which it locates. This results in an annular recess surrounding the retaining plate 53.

An elastomeric seal 57 locates in the recess surrounding the retaining plate 53. Seal 57 has a flat circular face that faces toward the seat 21 located on the downstream side of seat slot 19. Seal 57 has an integral support section 57a. The support section 57a locates within a groove 58 formed in the plate carrier 23. The outer diameter of the support section 57a is greater than the base portion of the seal 57. The groove 58 will hold the seal 57 in the plate carrier 23. An external shoulder 53a on the retaining plate 53 holds the retaining plate 53 with the seal 57. Shoulder 53a is located on the outer diameter of the retaining plate 53 and faces toward the seat 21 on the downstream side of seat slot 19.

Plate carrier 23 has an annular hydraulic chamber 59. Hydraulic chamber 59 locates radially outward of the seal 57 with reference to the axis of the plate carrier 23. Passages 61 will communicate hydraulic fluid in the hydraulic chamber 59 with the support section 57a of the seal 57.

In the embodiment of FIG. 2, the hydraulic fluid will be introduced by removing a filler plug 63 located in the bottom of the plate carrier 23. The filler plug 63 secures by threads within a filler passage 64. The hydraulic fluid may be various substantially incompressible liquids of a fairly viscous nature. Filling will be done while the plate carrier 23 has been removed from the orifice fitting 11, and preferably with the plate carrier 23 inverted.

A piston 65 will be carried within a cylindrical portion 66 of the hydraulic chamber 59. Cylindrical portion 66 is located on the upper end of the plate carrier 23. Piston 65 is a small cylindrical member which will move vertically upward and downward perpendicular to the flow passage 15. Seal rings 67 seal the piston 65 within cylindrical portion 66 of the hydraulic chamber 59. A Belleville spring 69 on the upper side of the piston 65 serves to prevent over pressurizing of the hydraulic fluid in the hydraulic chamber 59.

A pin 71 moves the piston 65 radially downward when the pin 71 is pushed downward. Pin 71 is a plunger type member that protrudes upward from the plate carrier 23. Pin 71 has a flange 73 that is carried inside the cylindrical portion 66 of the hydraulic chamber 59. Flange 73 contacts the Belleville spring 69. A threaded ring 75 allows the passage of the plunger portion of pin 71 but retains the flange 73 within the hydraulic chamber cylindrical portion 66. The cam plate 51 of the slide valve carrier 43 will contact the pin 71 to push it downward when the slide valve carrier 43 moves to the closed position shown in FIG. 1.

In the operation of the embodiment of FIGS. 1 and 2, the plate carrier 23 will be filled with a hydraulic fluid within the hydraulic chamber 59. Initially, the plate carrier 23 will be installed in the upper chamber 37 while the slide valve 45 closes the slot 35. Then, the slide valve 45 will be opened by the slide valve carrier 43 to equalize the pressure in the lower chamber 33 with the upper chamber 37. Then, the gears 41 and 39 will move the plate carrier 23 downward into the seat slot 19. The lower edge of the plate carrier 23 will contact the stop screw 42.

Then, the operator will rotate the gear 49 to move the slide valve carrier 43 to the closed position shown in FIG. 1. The cam plate 51 will contact the pin 71. As shown in FIG. 2, this will cause the pin 71 to move downward, or radially inward. This movement pushes the piston 65 radially inward. The hydraulic fluid pressure increases. This increased pressure acts on the support section 57a, pushing the seal 57 tightly against the seat 21. At the same time this occurs, the slide valve 45 will close the upper chamber 37 against pressure in the lower chamber 33.

Gas will flow through the orifice plate hole 27. Measurement equipment will measure the pressure at the ports 29 and 31 in order to determine the flow rate of the gas. If the plate carrier 23 is to be removed to the upper chamber 37 to the inactive position, the steps above will be reversed. Removal of the cam plate 51 from the pin 71 will reduce the hydraulic pressure in the chamber 59.

Figure 3:
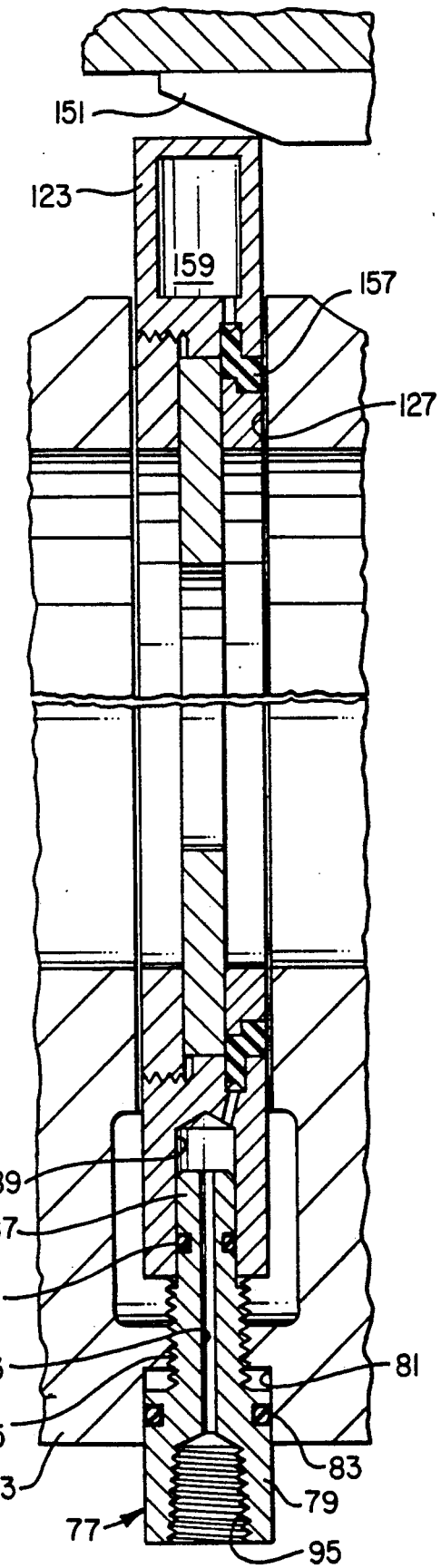
FIG. 3 is an alternate embodiment showing a portion of an orifice fitting constructed in accordance with this invention.

In the embodiment of FIG. 3, elements which are substantially the same or similar to that of the first embodiment will be numbered the same except for the addition of a prefix "1". In this embodiment, there is no piston 65 nor pin 71. Rather, the cam plate 151 bears against the upper edge of the plate carrier 123 in a conventional manner. Hydraulic fluid to the hydraulic chamber 159 is pressurized in a different manner. This different structure includes an injection fitting 77 that locates on the bottom of the body 113. Injection fitting 77 has a lower head 79 that extends downward from the body 113. Head 79 locates in a cylindrical recess 81 on the lower side of body 113. Annular seal 83 seals the head 79 in the recess 81. The injection fitting 77 has threads 85 which engage threads in the body 113 just above the recess 81.

Injection fitting 77 has an upward protruding mandrel 87. Mandrel 87 is a tubular member that is positioned to engage a cylindrical filling passage 89. Filling passage 89 locates on the lower end of the plate carrier 123. Seal ring 91 seals the mandrel 87 within the filling passage 89. A passage 93 extends through the length of the injection fitting 77. Threads 95 are located at the lower end of passage 93 for receiving a closure plug (not shown).

In the operation of the embodiment of FIG. 3, the plate carrier 123 will stab into the mandrel 87 as it moves into its lower position. The cam plate 151 will push downward on the plate carrier 123.

Then, hydraulic fluid may be introduced into the hydraulic chamber 159. The hydraulic fluid source (not shown) connects to the threads 95. The hydraulic fluid will be pumped through the passage 93. The hydraulic fluid source could be used to pressurize the hydraulic chamber 159 to a selected amount. This degree of pressure will be the amount desired to deform the seal 157 tightly against the seat 121. A valve (not shown) could be connected to the threads 95 to hold pressure.

The operator can also pressurize the hydraulic fluid by rotating the injection fitting 77. As injection fitting 77 rotates, it will move upward relative to the body 113. This upward movement causes the mandrel 87 to advance upward relative to the plate carrier 123. This decreases the volume for the hydraulic fluid in the hydraulic chamber 159, therefore increasing the pressure.

When the plate carrier 123 subsequently is moved to the inactive position, it will release its engagement from the mandrel 87. The hydraulic fluid contained in the hydraulic chamber 159 will drop out. This presents no problem, as the amount of fluid is small. However, a check valve (not shown) could be utilized in the filling passage 89 to retain the hydraulic fluid.

The invention has significant advantages. Energizing the seal allows the assembled plate carrier and seal to have a smaller width than the seat slot. This allows the assembly to be lowered into the seat slot without cutting or otherwise damaging the face of the elastomeric seal. The face of the elastomeric seal is flush with the plate carrier, also reducing the chance for damage to the seal. Energizing the seal with hydraulic pressure causes a tight seal to occur even if the seat face is irregular, corroded or otherwise damaged. The energizing takes place in the first embodiment automatically as the slide valve carrier moves to the closed position. The second embodiment allows one to select the hydraulic pressure desired.

While the invention has been shown in only two of its forms, it should be apparent to those skilled in the art that it is not so limited, but is susceptible to various changes without departing from the scope of the invention.

We claim:

1. In an orifice fitting of the type having a body with a flow passage for connecting into a pipeline, an orifice seat located in the flow passage, a plate carrier which carries an orifice plate having a hole therethrough for the passage of gas, and gear means in the body for moving the plate carrier from an inactive position out of the flow passage to an active position in engagement with the seat and with the orifice plate in the flow passage, an improved means for sealing the plate carrier against the seat, comprising in combination:
    an annular seal mounted to the plate carrier for sealing engagement with the seat;
    energizing means in the plate carrier actuable after the plate carrier is adjacent the seat for urging the seal against the seat; and
    wherein the orifice fitting has a slide valve carrier means which moves between open and closed positions transverse to the movement of the plate carrier for retaining the plate carrier in the active position, and wherein the energizing means is actuated by the movement of the slide valve carrier means to the closed position.

2. In an orifice fitting of the type having a body with a flow passage for connecting into a pipeline, an orifice seat located in the flow passage, a plate carrier which carries an orifice plate having a hole therethrough for the passage of gas, and gear means in the body for moving the plate carrier from an inactive position out of the flow passage to an active position in engagement with the seat and with the orifice plate in the flow passage, an improved means for sealing the plate carrier against the seat, comprising in combination:
    an annular seal mounted to the plate carrier for sealing engagement with the seat;
    energizing means in the plate carrier actuable after the plate carrier is adjacent the seat for urging the seal against the seat; and
    wherein the orifice fitting has an upper chamber and a lower chamber interconnected by a slot, wherein the hear means moves the plate carrier through the slot from the lower chamber into the upper chamber when moving the plate carrier to the inactive position, and wherein the orifice fitting has a slide valve carrier means for moving a slide valve transverse to the plate carrier to open and close the slot when the plate carrier is in the inactive and in the active positions and for retaining the plate carrier in the active position, and wherein the energizing means is actuated by the movement of the slide valve carrier means to the closed position.

3. In an orifice fitting of the type having a body with an upper chamber, a lower chamber, and a flow passage located below the lower chamber for connecting into a pipeline, a slot between the upper and lower chambers, an orifice seat located in the flow passage, a plate carrier which carries an orifice plate having a hole therethrough for the passage of gas, means for moving the plate carrier from an inactive position within the upper chamber to an active position in engagement with the seat and with the orifice plate in the flow passage, and a slide valve carrier which carries a slide valve and moves between open and closed positions transverse to the movement of the plate carrier to open and close the slot and to retain the plate carrier in the active position, an improved means for sealing the plate carrier against the seat, comprising in combination:
    an annular seal mounted to the plate carrier for sealing engagement with the seat; and
    energizing means in the plate carrier actuable in response to movement of the slide valve carrier to the closed position for urging the seal against the seat.

4. The orifice fitting according to claim 3 wherein the energizing means comprises:
    a hydraulic chamber located in the plate carrier, for containing hydraulic fluid and being in communication with the seal; and
    means actuated by the slide valve carrier when in the closed position for applying pressure to the hydraulic fluid to move the seal against the seat.

5. The orifice fitting according to claim 3 wherein the energizing means comprises:
    a hydraulic chamber located in the plate carrier, for containing hydraulic fluid and being in communication with the seal;
    a piston located in the hydraulic chamber;
    a pin in engagement with the piston and protruding from the plate carrier, the slide valve carrier causing the pin and piston to move and increase hydraulic pressure when the slide valve carrier moves to the closed position.

6. The orifice fitting according to claim 3 wherein the energizing means comprises:
    a pin protruding radially outward from the plate carrier; and
    means in the plate carrier for pushing the seal against the seat in response to radial inward movement of the pin;

the slide valve carrier causing the pin to move radially inward as the slide valve carrier moves to the closed position.

7. In an orifice fitting of the type having a body with a flow passage for connecting into a pipeline, an orifice seat located in the flow passage, a plate carrier which carries an orifice plate having a hole therethrough for the passage of gas, and means in the body for moving the plate carrier from an inactive position out of the flow passage to an active position in engagement with the seat and with the orifice plate in the flow passage, an improved means for sealing the plate carrier against the seat, comprising in combination:
- an annular seal mounted to the plate carrier for sealing engagement with the seat;
- a hydraulic chamber located in the plate carrier, for containing hydraulic fluid and being in communication with the seal; and
- means for applying pressure to the hydraulic fluid to move the seal against the seat.

8. The orifice fitting according to claim 7 wherein the means for applying pressure comprises:
- a piston located in the hydraulic chamber and being movable in radially inward and outward directions relative to the plate carrier;
- a pin protruding radially from the plate carrier, the pin being in contact with the piston and being movable in radially inward and outward directions relative to the plate carrier; and
- means for causing the pin to move radially inward as the plate carrier moves into the active position.

9. The orifice fitting according to claim 7 wherein the orifice fitting has a slide valve carrier means which moves between open and closed positions transverse to the movement of the plate carrier for retaining the plate carrier in the active position, and wherein the means for applying pressure comprises:
- a piston located in the hydraulic chamber and being movable in radially inward and outward directions relative to the plate carrier;
- a pin protruding radially from the plate carrier, the pin being in contact with the piston and being movable in radially inward and outward directions relative to the plate carrier; and
- the slide valve carrier means causing the pin to move radially inward as the slide valve carrier means moves into the closed position.

10. The orifice fitting according to claim 7 wherein the plate carrier has retaining rings located on each side of the orifice plate for retaining the orifice plate in the plate carrier, one of the retaining rings defining an annular recess for receiving the seal, and wherein a passage extends from the hydraulic chamber to the recess.

11. The orifice fitting according to claim 7 further comprising a filling passage extending from the exterior of the plate carrier to the hydraulic chamber, and a plug for closing the filling passage once the chamber is filled with hydraulic fluid.

12. The orifice fitting according to claim 7 further comprising a filling passage extending from the bottom of the plate carrier to the hydraulic chamber; and
- an injection fitting mounted to the body below the plate carrier, the injection fitting having an upward protruding mandrel positioned to fit within the filling passage when the plate carrier moves to the active position, the injection fitting allowing hydraulic fluid to be introduced into the filling passage from a source exterior of the body when the plate carrier is in the active position.

13. The orifice fitting according to claim 12 wherein the injection fitting secures by threads to the body to enable pressure in the hydraulic chamber to be increased after filling by rotating the injection fitting relative to the body to screw it further into the body.

14. In an orifice fitting of the type having a body with an upper chamber, a lower chamber, and a flow passage located below the lower chamber for connecting into a pipeline, a slot between the upper and lower chambers, an orifice seat located in the flow passage, a plate carrier which carries an orifice plate having a hole therethrough for the passage of gas, means for moving the plate carrier from an inactive position within the upper chamber to an active position in engagement with the seat and with the orifice plate in the flow passage, and a slide valve carrier which carries a slide valve and moves between open and closed positions transverse to the movement of the plate carrier to open and close the slot and to retain the plate carrier in the active position, an improved means for sealing the plate carrier against the seat, comprising in combination:
- an annular seal mounted to the plate carrier for sealing engagement with the seat;
- a hydraulic chamber located in the plate carrier, for containing hydraulic fluid and being in communication with the seal;
- a piston located in the hydraulic chamber and being movable in radially inward and outward directions relative to the plate carrier;
- a pin protruding radially from the plate carrier, the pin being in contact with the piston and being movable in radially inward and outward directions relative to the plate carrier; and
- the slide valve carrier causing the pin to move radially inward as the slide valve carrier moves into the closed position, applying pressure to the hydraulic fluid to urge the seal against the seat.

15. The orifice fitting according to claim 14 wherein the plate carrier has retaining rings located on each side of the orifice plate for retaining the orifice plate in the plate carrier, one of the retaining rings defining an annular recess for receiving the seal, and wherein a passage extends from the hydraulic chamber to the recess.

16. The orifice fitting according to claim 14 further comprising a filling passage extending from the exterior of the plate carrier to the hydraulic chamber, and a plug for closing the filling passage once the chamber is filled with hydraulic fluid.

* * * * *